Figure 1:
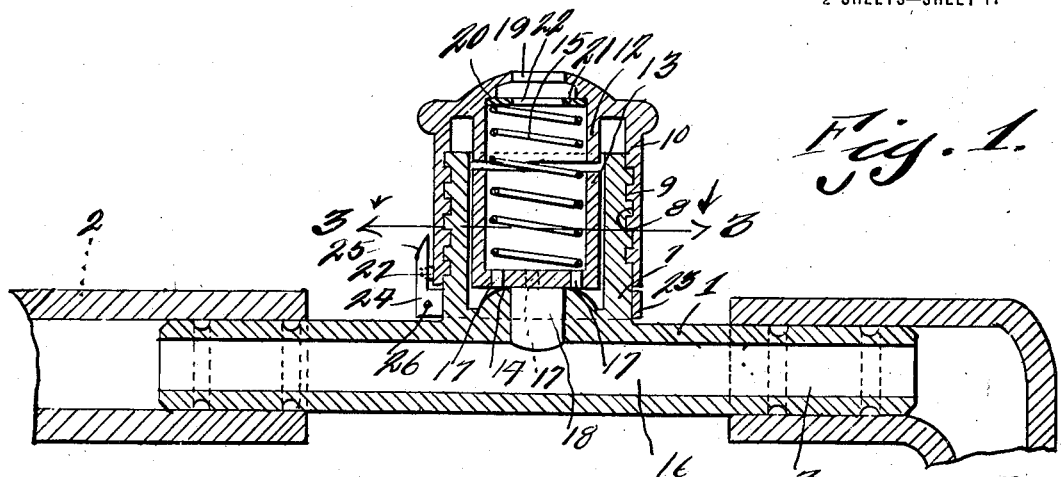

G. W. GIRARD & C. W. BUTLER.
PRESSURE INDICATOR.
APPLICATION FILED FEB. 2, 1916.

1,187,300.

Patented June 13, 1916.

2 SHEETS—SHEET 1.

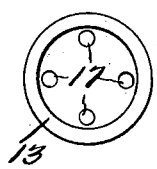
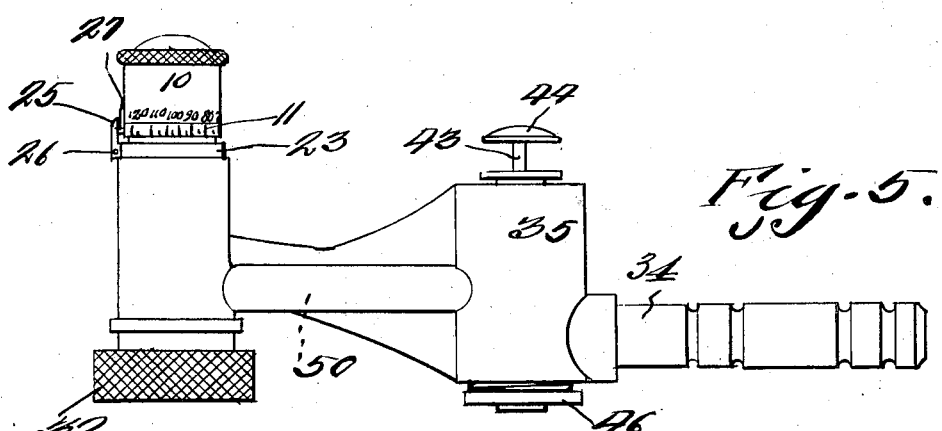
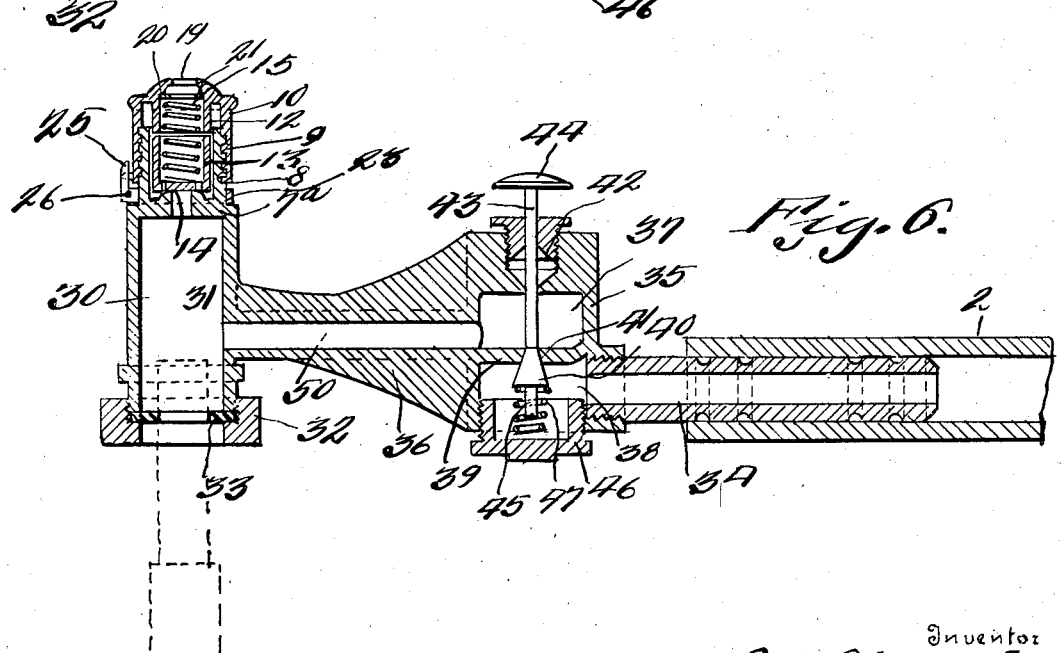

UNITED STATES PATENT OFFICE.

GEORGE W. GIRARD AND CHANCEY WARD BUTLER, OF INDEPENDENCE, OREGON.

PRESSURE-INDICATOR.

1,187,300.  Specification of Letters Patent.  Patented June 13, 1916.

Application filed February 2, 1916. Serial No. 75,735.

*To all whom it may concern:*

Be it known that we, GEORGE W. GIRARD and CHANCEY WARD BUTLER, citizens of the United States, residing at Independence, in the county of Polk, State of Oregon, have invented a new and useful Pressure-Indicator; and we do hereby declare the following to be full, clear, and exact description of the invention, such as will enable others skilled in the art to which it appertains to make and use the same.

This invention relates to a new and useful pressure indicator, adapted for use in connection with pneumatic tires for indicating the amount of air pressure therein.

One of the objects of the invention is the provision of an improved simple and efficient and practical device of this nature, which may be set for a predetermined pressure in the tire, and when the air reaches this pressure, a valve in the indicator will rise against the action of a spring, and the air will blow off, and when blowing off from the top of the indicator it will create sound or whistling, thereby indicating that the requisite pressure in the tire has been attained.

In practical fields the details of construction may necessitate alterations, falling within the scope of what is claimed.

The invention comprises further features and combination of parts, as hereinafter set forth, shown in the drawings and claimed.

Figure 2:
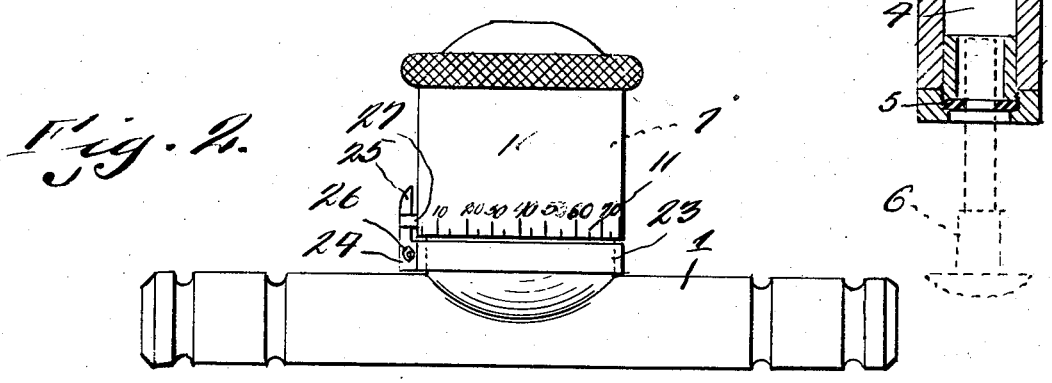
Figure 3:
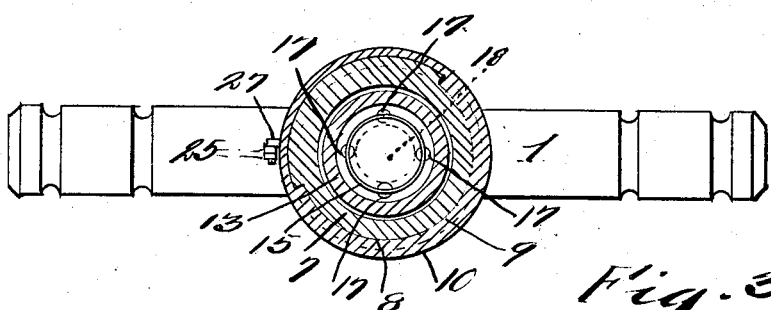

In the drawings: Figure 1 is a sectional view taken longitudinally through the pressure indicator constructed in accordance with the invention, showing a pipe which may connect the check valve intake of the tire and the source of air supply under pressure, whereby the amount of pressure permitted to escape past the controlling valve of the source of air supply, as well as the amount of pressure in the tire may be ascertained. Fig. 2 is a view in side elevation of the structure shown in Fig. 1. Fig. 3 is a sectional view on line 3—3 of Fig. 1; Fig. 4 is a top plan view of the valve on the interior of the indicator. Fig. 5 is a view in side elevation of another form of indicator, to which the supply tube from the source of air supply may be connected, illustrating a valve for controlling the air from the source of supply, and illustrating the means to fit telescopically down over the air check valve of the tire. Fig. 6 is a sectional view taken longitudinally through the structure shown in Fig. 5.

Referring more especially to the drawings, 1 designates a tubular member, to one end of which a suitable flexible hose or the like 2 is connected, which in turn may be connected to any suitable source of pneumatic pressure (not shown), and which flexible hose or tube 2 may be provided with a suitable valve (not shown), whereby only a certain amount of air under pressure may be allowed to pass through the tubular member 1. The other end portion 3 of the tubular member 1 is connected to a coupling device 4, which is provided with an air tight connection 5 with the intake air check valve shown in dotted lines at 6 of the pneumatic tire (not shown). The tubular member 1 has a lateral hollow extension 7, which is exteriorly threaded as shown at 8, and are engaged by similar interior threads 9 of the indicator cap 10. This indicator cap may be any suitable shape or configuration, and has upon its exterior surface adjacent its lower edge a plurality of graduations 11, which indicate the amount of pressure in the tire. The indicator cap on the interior near its upper part is provided with an inturned annular flange 12, which extends partially into the lateral extension 7, and which flange 12 constitutes an abutment means to limit the valve 13 (which is disposed on the interior of the lateral extension 7, to coöperate with the valve seat 14) in its upward movement.

If it is required that the pressure in the chamber 16 or in the pneumatic tire (not shown) be ninety pounds, then the indicator cap 10 is adjusted, so as to tension the spring accordingly, in which case the valve 13 will raise, when the pressure reaches ninety pounds. If the pressure is required to be more or less than ninety pounds, then the indicator cap 10 is adjusted accordingly, to vary the tension of the spring 15. The bottom of the valve 13 is provided with a plurality of apertures 17, for instance four in number, and which apertures combined correspond substantially with the capacity of the opening of communication 18 between the lateral extension 7 and the chamber 16. However, these apertures are so arranged in the lower wall or bottom of the valve 13, that when the valve is in its lowermost position, the apertures are beyond the diameter of the opening 18, in which case when the bottom of the valve 13 is in contact with the seat 14, communication between the chamber 16 and the interior of the extension 7 is cut off. The top wall of the indicator cap has an opening 19, and an adjoining or adjacent shoulder 20, with which the disk plate 21 (which is provided with an opening 22 corresponding to the opening 19) engages. The spring 15 is interposed between the disk 21 and the upper face of the bottom of the valve 13. It is to be noted that the openings 19 and 22 are of such corresponding diameters and in such spaced relation, that when the pressure in the chamber 16 reaches the requisite amount, and the valve unseats, to allow the excessive air pressure to blow off, the air passing through the apertures or openings 19 and 22 will create a whistling noise, thereby giving alarm that the requisite pounds of pressure has been attained. Surrounding the base portion of the lateral extension 7 adjacent the tubular member 1 is a band 23, which is severed, and the severed ends are provided with ears 24, between which an indicator or pointer 25 is clamped, by means of the set bolt or screw 26. Projecting laterally from the side of the indicator cap 10 is a lug 27, which is designed to contact with one side of the indicator or pointer 25. It is to be noted that the band 23 may be adjusted relative to the indicator cap, so that the indicator or pointer may coöperate with the graduation 11. If the pressure in the chamber 16 or in the pneumatic tire is required to be ninety pounds, the band 23 and the indicator cap 10 may be adjusted so that the indicator or pointer registers with ninety pounds on the scale or graduations 11, the tension of the spring 15 having been regulated accordingly, the air from the source of supply is allowed to enter the chamber 16 and into the tire, and when the pressure reaches ninety pounds, the valve will unseat and the sound created, thereby indicating the amount of pressure.

In Figs. 5 and 6 the part 7ª of the indicator, which part 7ª corresponds with the lateral hollow extension 7, forms an integral part with the casing 30 having a chamber 31, which corresponds with the chamber 16. A cap 32 is threaded on the lower end of the casing 30, and between this cap 32 and the lower end of the casing a packing washer 33 is disposed. The casing 30 is adapted to telescope over the intake check valve of a pneumatic tire, so that the washer 33 will fit tightly about the exterior surface of the air intake check valve of the tire, thereby preventing the escape of the air under pressure. In Figs. 5 and 6 the hose 2, from any suitable source of air supply, is connected to the extension tube 34 of the valve casing 35, which is connected integrally to the casing 30, by means of the tubular section 36. The valve casing 35 is provided with upper and lower chambers 37 and 38, there being a divisional wall 39 between the two chambers. A conical valve 40 normally engages with the valve seat or valve opening 41 in the wall 39. The stem 43 of the valve 40 passes through the packing gland 42, and upon the upper end of the stem 43 is a push knob 44. The lower part of the valve 40 has an extension 45. Threaded into the lower part of the casing 35 is a cap plug 46, between which and the lower end of the valve 40 a spring 47 (which surrounds the extension 45) is interposed. It is to be observed that the cap lug 46 may be adjusted to increase or decrease the tension of the spring 47. When the casing 30 is fitted telescopically over the inflating check valve of the tire, the operator depresses the valve stem 43, by bearing upon the knob or disk 44, thereby allowing the air under pressure from the source of supply (not shown), to pass through the valve opening 41, into the chamber 37, and thence into the chamber 31 of the casing 30, by way of the passage 50 of the integral connection 36, thereby acting upon the check valve of the inflating device of the tire, and when the pressure reaches the requisite amount, the indicator operates as before stated.

The invention having been set forth, what is claimed as new and useful is:

1. In a pressure indicator, a casing, an indicator cap threaded on the casing and having an outlet opening in its upper end and provided with an inturned annular flange partially extending into the casing, a valve having openings in its bottom coöperating between the flange and the bottom of the casing, a spring interposed between the top of the cap and the valve to hold the valve against the bottom of the casing, and means of communication between the casing and a pneumatic tire.

2. In a pressure indicator, a casing, an indicator cap having pressure indicating graduations adjustably threaded on the casing and having an outlet opening in its upper end and provided with an inturned annular flange partially extending into the casing, a valve having openings in its bottom coöperating between the flange and the bottom of the casing, a spring interposed between the top of the cap and the valve to hold the valve against the bottom of the casing, and means of communication between the casing and the pneumatic tire.

3. In a pressure indicator, a casing, an indicator cap having pressure indicating graduations adjustably threaded on the casing and having an outlet opening in its upper end and provided with an inturned annular flange partially extending into the casing, a valve having openings in its bottom coöperating between the flange and the bottom of the casing, a spring interposed between the top of the cap and the valve to hold the valve against the bottom of the casing, and means of communication between the casing and the pneumatic tire, and a band adjustable on the casing and provided with an indicator or pointer to coöperate with said graduations.

4. In a pressure indicator, a casing, an indicator cap having graduations adjustably threaded on the casing and having an outlet opening in its upper end, the interior of the cap adjacent its top having a shoulder, a disk having an opening corresponding in diameter to the opening in the top of the cap engaging said shoulder, a valve having openings in its bottom, the bottom of the casing having a valve seat between which and the cap the valve coöperates, a spring interposed between the disk plate and the bottom of the valve to hold the valve against the seat, and means of communication between the casing and the pneumatic tire, said disk plate being so spaced apart from the top of the cap, whereby as the valve rises and the air escapes, a whistling noise is created as the air passes through the opening of the disk and the top of the cap.

5. In a pressure indicator, a casing, an indicator cap having graduations adjustably threaded on the casing and having an outlet opening in its upper end, the interior of the cap adjacent its top having a shoulder, a disk having an opening corresponding in diameter to the opening in the top of the cap engaging said shoulder, a valve having openings in its bottom, the bottom of the casing having a valve seat between which and the cap the valve coöperates, a spring interposed between the disk plate and the bottom of the valve to hold the valve against the seat, and means of communication between the casing and the pneumatic tire, said disk plate being so spaced apart from the top of the cap, whereby as the valve raises and the air escapes, a whistling noise is created as the air passes through the opening of the disk and the top of the cap, and a band adjustable on the casing and provided with an indicator or pointer to coöperate with said graduations, and a lug on the cap to coöperate with the pointer for limiting the cap in its movement.

6. In a pressure indicator, a casing, an indicator cap threaded on the casing and having an outlet opening in its upper end and provided with an inturned annular flange partially extending into the casing, a valve having openings in its bottom coöperating between the flange and the bottom of the casing, a spring interposed between the top of the cap and the valve to hold the valve against the bottom of the casing, said casing having an extension tube provided with telescopical connections with a check valve inflating tube of a pneumatic tire, and provided with an air conduit through which air under pressure passes.

In testimony whereof we have signed our names to this specification in the presence of two subscribing witnesses.

GEORGE W. GIRARD.
CHANCEY WARD BUTLER.

Witnesses:
VERD HILL,
W. S. KURRE.